United States Patent [19]

Gaalema et al.

[11] Patent Number: 4,803,363

[45] Date of Patent: Feb. 7, 1989

[54] INFRARED DETECTOR WITH INTEGRAL FEEDBACK CAPACITANCE

[75] Inventors: Steve D. Gaalema, Encinitas; Frank L. Augustine, Escondido, both of Calif.

[73] Assignee: Hughes Aircraft Company, Los Angeles, Calif.

[21] Appl. No.: 42,757

[22] Filed: Apr. 27, 1987

[51] Int. Cl.[4] .................. G01J 5/20; H01L 31/00; H01L 27/14

[52] U.S. Cl. .................. 250/338.4; 250/370.01; 250/370.14; 357/30

[58] Field of Search ........ 250/338 SE, 370 K, 370 G, 250/370 R, 211 J, 578, 332; 357/51, 30 G, 30 Q, 30 H, 30 D

[56] References Cited

U.S. PATENT DOCUMENTS 4,636,833  1/1987  Nishioka et al. .................. 357/71
4,684,800  8/1987  Morse et al. .................. 250/211 J Primary Examiner—Janice A. Howell
Assistant Examiner—Constantine Hannaher
Attorney, Agent, or Firm—Kenneth W. Float; A. W. Karambelas

[57] ABSTRACT

An infrared detector assembly is disclosed which includes a photosensitive layer (111) and a first planar contact structure (113) conductively coupled to the photosensitive layer for collecting charge carriers generated by radiation incident on the photosensitive layer. The detector assembly further includes a second planar contact structure (119) substantially coextensive with and separated from the first planar contact structure. A dielectric layer (115) separates the first and second planar contact structures. The first and second planar contact structures and the dielectric structure form a feedback capacitor which is integral with the detector assembly and which provides feedback capacitance for an externally provided amplifier.

13 Claims, 1 Drawing Sheet

INFRARED DETECTOR WITH INTEGRAL FEEDBACK CAPACITANCE

BACKGROUND OF THE INVENTION

The disclosed invention is generally directed to infrared radiation detectors, and is more particularly directed to an infrared radiation detector structure which includes integral feedback capacitance for use with a capacitive-feedback transimpedance readout amplifier.

Infrared detectors are utilized to detect radiation having wavelengths in the infrared spectral region. Generally, infrared detectors are semiconductor devices which provide electrical signals as outputs in response to incident infrared radiation. For example, infrared detectors may be made of silicon doped with appropriate impurities such as gallium or arsenic.

Infrared detectors are generally fabricated in the form of integrated circuit detector assemblies wherein a detector assembly includes a semiconductor radiation detecting layer having a plurality of implanted detector contacts arranged in a grid or array, for example. The implanted detector contacts define the pixels of the detector and function to collect free charge carriers that result from incident radiation received by the portions of the radiation detecting layer adjacent the respective implanted contacts.

Integrated circuit detector assemblies are often incorporated in hybridized detector/readout assemblies. Such hybridized assemblies include a generally planar integrated circuit detector assembly and a generally planar integrated circuit readout amplifier assembly. The detector assembly and the readout amplifier assembly may be mechanically secured to each other in layered fashion by cold welds formed with indium bumps which conductively connect the implanted detector contacts to contacts formed in the readout amplifier assembly.

For some applications, cold-welded indium bumps are not structurally sufficient to withstand anticipated mechanical stresses during use. To provide additional mechanical strength, wicking epoxy is used to supplement the cold welds. The viscosity of the epoxy is chosen to be low enough to allow the epoxy to squeeze between and around the cold-welded bumps. However, the epoxy layers are not always uniform, in that air gaps and other discontinuities may form between the cold-welded bumps. This leads to nonuniform detector response problems in the finished device.

A particular type of amplifier utilized in readout amplifier assemblies is known as a capacitive feedback transimpedance amplifier which includes a high gain operational amplifier and feedback capacitance. The capacitive feedback transimpedance amplifier integrates the detector current over a predetermined integration period, at the end of which the amplifier output is sampled.

In known hybridized detector/readout assemblies, both the operational amplifier and the feedback capacitors are formed in the readout assembly. The feedback capacitance for each of the operational amplifiers is provided by respective parallel plate capacitors disposed in the readout assembly. Particularly, each feedback capacitor comprises two parallel plates formed within the readout array, separated by a dielectric material. The first plate is conductively coupled by means of an indium bump, for example, to a planar implanted contact in the detector array.

The implanted detector contact, which is connected to the first capacitor plate, generally forms a larger area than the second capacitor plate in the readout array. The difference in area creates unwanted E-field lines that terminate in the substrate of the readout array. The result is parasitic capacitance to ground which limits the signal-to-noise ratio and gain of the system.

Further considerations with the foregoing structure include limitations on packing density for the readout array since some of the components for providing the feedback capacitance are formed therein. Further, the foregoing structure requires precise hybridization of the detector assembly and the readout assembly since responsivity variations may result from nonuniformities in the spacing between the detector assembly and the readout assembly, voids in any wicking epoxy utilized, misalignment between the detector assembly and the readout array, as well as other variations resulting from hybridization. Such hybridization nonuniformities result in nonuniformities in gain as between the respective transimpedance amplifiers in a given hybridized assembly, which in turn may result in a degraded signal-to-noise ratio since smaller, nonoptimum biasing must be applied to the detectors.

SUMMARY OF THE INVENTION

It would therefore be an advantage to provide an infrared detector assembly which provides for reduced stray capacitance.

It would also be an advantage to provide an infrared detector assembly which provides for improved signal-to-noise ratios.

A further advantage would be to provide an infrared detector assembly which includes integral feedback capacitance for use in capacitive feedback transimpedance readout amplifiers.

Still another advantage would be to provide an infrared detector assembly which substantially reduces responsivity variations due to hybridization processing.

The foregoing and other advantages are provided in an infrared detector assembly which includes a photosensitive layer and a first planar contact structure conductively coupled to the photosensitive layer for collecting charge carriers generated by radiation incident on the photosensitive layer. The detector assembly further includes a second planar contact structure substantially coextensive with the first planar contact structure. A dielectric layer separates the first and second planar contact structures. The first and second planar contact structures and the dielectric structure form a feedback capacitor which provides an integral feedback capacitance for an externally provided amplifier.

The present invention, in integrating the capacitive components in the detector assembly, has eliminated a primary source of parasitic capacitance, and in addition, has reduced possible detector nonuniformity problems associated with capacitance variations caused by nonuniformity in the epoxy bonding process associated with the indium bumps employed as output contacts in the detector assembly.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
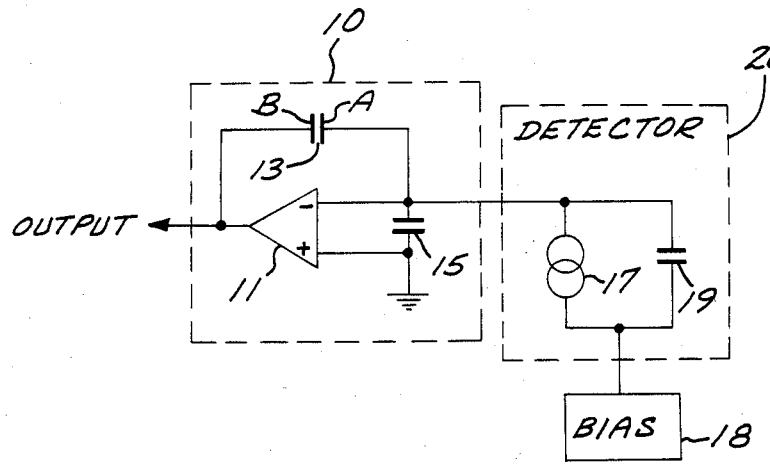
FIG. 1 is a schematic diagram of a transimpedance amplifier which utilizes the infrared detector assembly of the invention.

In the following detailed description and in the several figures of the drawing, like elements are identified with like reference numerals.

Referring now to FIG. 1, shown therein is a simplified circuit schematic of a capacitive feedback transimpedance amplifier 10 with which the infrared radiation detector of the disclosed invention may be used. The amplifier 10 includes a high gain operational amplifier 11 which has a feedback capacitance 13 coupled between the output of the operational amplifier 11 and its inverting input. For later reference, the capacitance 13 is provided by capacitor plates A and B which will be discussed relative to infrared radiation detector of the invention. The noninverting input of the operational amplifier 11 is coupled to a ground reference voltage potential.

The capacitive feedback transimpedance amplifier 10 further includes a parasitic capacitance 15 coupled between the inverting and noninverting input of the operational amplifier 11. The parasitic capacitance 15 is included since it is not insignificant and results from the structure of the infrared detector assembly of the invention and a readout assembly with which it is used. While the parasitic capacitance 15 is shown as a discrete element, it is actually a distributed element, as will become apparent.

A detector 20 is coupled between the inverting input of the operational amplifier 11 and a bias voltage source 18 which acts as an AC ground. The detector 20 is schematically shown as a variable current source 17 coupled between the inverting input of the operational amplifier 11 and the bias voltage source 18. A detector capacitance 19 is in parallel with the variable current source 17. The detector capacitance also results from the structure of the infrared detector assembly of the invention. While the detector capacitance 19 is shown as a discrete element, it is actually a distributed element as will be apparent from further discussion herein.

Figure 2:
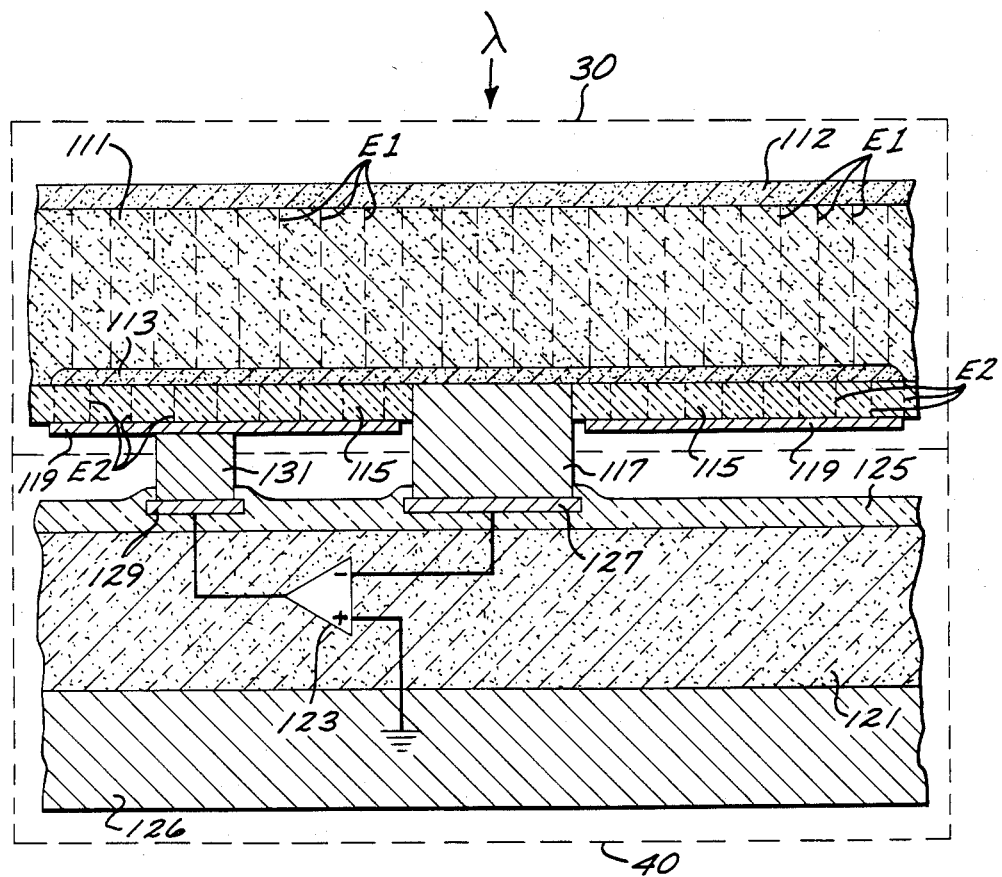
FIG. 2 is sectional diagram of the structure of the infrared detector assembly of the invention and a section of a corresponding readout amplifier array.

Referring now to FIG. 2, disclosed therein is a radiation detector 30 in accordance with the invention and an associated portion of a readout assembly 40. The radiation detector 30 can be a portion of a detector array that includes a plurality of radiation detectors substantially similar to the radiation detector 30. Such plurality of radiation detectors can be arranged in a predetermined pattern such as a grid. The readout assembly 40 includes operational amplifiers and other elements respectively associated with the plurality of radiation detectors.

The radiation detector 30 includes a photosensitive detecting layer 111 which comprises an appropriately doped semiconductor material, for example. The photosensitive layer 111 can be formed on a substrate (not shown) that is transparent or substantially transparent to infrared radiation. A transparent or substantially transparent common contact layer 112 is formed above the photosensitive layer 111, as shown, or would be formed above any substrate on which the photosensitive layer 111 may be formed. In use, the radiation detector 30 is adapted to receive incident radiation from above the photosensitive layer 111 as indicated by the vertical arrow and the reference λ. Such incident radiation passes through the transparent or substantially transparent common contact layer 112 and any substrate on which the photosensitive layer 111 is formed.

A planar implanted detector contact region 113 is formed in the bottom of the photosensitive layer 111, and the portion of the photosensitive layer 111 above the implanted detector contact region 113 substantially defines a radiation detection region of the radiation detector 30. A silicon dioxide insulating layer 115 is formed beneath the planar implanted contact region 113 and includes an opening for accommodating a conductive contact, such as an indium bump 117, or the like. The radiation detector 30 further includes a conductive layer 119 formed beneath the insulating layer 115 and surrounding the indium bump 117. By way of example, the conductive layer 119 may be formed by appropriate masking and metallization. Alternatively, the conductive layer 119 can be made of polysilicon, or the like.

In plan view, the implanted contact region 113 and the conductive layer 119 can be, by way of example, square in outline, with the conductive layer 119 having an opening for accommodating the indium bump 117. The conductive layer 119 forms a metallized contact which is substantially coextensive with the implanted contact region 113.

The readout assembly 40 includes a semiconductor substrate 121 in which high gain operational amplifiers are formed pursuant to known integrated circuit processing technologies. One of the operational amplifiers is associated with each detector 30 and is schematically shown with the reference numeral 123. The readout assembly 40 further includes a silicon dioxide insulating layer 125 formed on the substrate 121. A conductive ground layer 126, which may be metal, is formed beneath the substrate 121. First and second planar contacts 127, 129 are formed in the insulating layer 125 which includes openings above the planar contacts 127, 129. The opening above the planar contact 127 is provided for the indium bump 117, while the opening above the planar contact 129 is provided for a second conductive contact, such as an indium bump 131 which is coupled to the conductive layer 119 of the radiation detector 30. By way of example, the planar contacts 127, 129 can be made of metal or polysilicon. The conductive contacts, although described herein as indium may also be made of other materials which are capable of being cold-welded together under pressure.

The planar contact 127 is coupled to the inverting input of the operational amplifier 123. The noninverting input of the operational amplifier 123 is coupled to the conductive ground layer 126 which is at ground voltage potential. The output of the operational amplifier 123 is coupled to the planar contact 129.

With further reference to the circuit of FIG. 1, the operational amplifier 123 of FIG. 2 corresponds to the operational amplifier 11 of FIG. 1, and the radiation detector 30 of FIG. 2 corresponds to the detector 20 of FIG. 1. Specifically, the capacitance provided by the common contact layer 112, the photosensitive layer 111, and the implanted contact region 113 corresponds to the capacitor 19 of FIG. 1. The current source 17 of FIG. 1 represents the current generating function of the radiation detector 30.

Referring further to FIGS. 1 and 2, the implanted detector contact region 113, the insulating layer 115, and the conductive layer 119 correspond to the feedback capacitance 13 of FIG. 1. Particularly, the implanted detector contact region 113 corresponds to plate A of the feedback capacitance 13, and the conductive layer 119 corresponds to plate B of the feedback capacitance 13. The parasitic capacitance is caused by the small amount of stray capacitance between the implanted contact region 113 of the radiation detector 30 and the substrate 121 of the readout assembly 40, as well as that between the implanted contact region 113 of the radiation detector 30 and the common contact layer 112.

The foregoing radiation detector structure is readily implemented with known types of detectors such as extrinsic silicon (in the form of bulk detectors and impurity band conduction detectors), intrinsic gallium arsenide, and extrinsic gallium arsenide, for example.

The foregoing described detector assembly 30 provides several advantages, including the following. In the detector assembly 30, the structure that provides feedback capacitance for use with the readout assembly 40 includes the implanted detector contact region 113 and the conductive layer 119. These structures are substantially coextensive, except for the opening in the conductive layer 119 for the indium bump 117. Thus, the E-field lines E2 are substantially confined to the region between the implanted contact region 113 and the conductive layer 119. As a result, the parasitic capacitance between the implanted contact region 113 and the substrate 121 of the readout assembly 40 is significantly reduced in comparison to known structures. As discussed previously in the background section, stray capacitance results from E-field lines extending between an implanted detector contact, similar to the contact region 113, and the substrate of a corresponding readout assembly.

The reduced parasitic capacitance provides for improved signal-to-noise ratio and gain which are inversely proportional to the sum of the parasitic capacitance 15 and the detector capacitance 19.

The structure that provides feedback capacitance is integral to the detector assembly 30, which permits greater packing density in the readout assembly 40. Further, as a result of the integral feedback capacitance structure, responsivity variations due to hybridization variations are reduced relative to known detector assemblies. Such hybridization variations include nonuniformities in the spacing between the detector assembly and the readout assembly, voids in any wicking epoxy which might be utilized, and misalignment between the detector and the readout assemblies.

Although the foregoing has been a description and illustration of specific embodiments of the invention, various modifications and changes thereto can be made by persons skilled in the art without departing from the scope and spirit of the invention as defined by the following claims.

What is claimed is:

1. An infrared detector comprising:
a photosensitive layer;
first planar contact means conductively coupled over its entire planar area to said photosensitive layer for collecting charge carriers generated by radiation incident on said photosensitive layer;
second planar contact means associated with and separated from said first planar contact means, said first and second planar contact means being substantially coextensive to substantially confine the electric contact means in the region between said first and second planar contact means; and
dielectric means interposed between said first and second planar contact means for dielectrically separating them, said first and second planar contact means and said dielectric means forming a feedback capacitor which provides for feedback capacitance for an externally provided amplifier associated with said detector.

2. The infrared detected of claim 1 wherein said first planar contact means comprises a doped planar region formed in said photo-sensitive layer.

3. The infrared detector of claim 1 wherein said second planar contact means comprises a deposited metal layer.

4. The infrared detector of claim 1 wherein said second planar contact means comprises a metallized layer.

5. The infrared detector of claim 1 wherein said second planar contact means comprises a polysilicon layer.

6. The infrared detector of claim 1 wherein said dielectric means comprises a silicon dioxide dielectric layer.

7. A detector structure comprising:
a photosensitive layer;
a first conductive layer adjacent over its entire area to said photosensitive layer for collecting charge carriers generated by radiation incident upon said photosensitive layer;
a second conductive layer separated from and substantially coextensive with said first conductive layer to substantially confine the electric field lines emanating from said first conductive layer in the region between said first second conductive layers;
a first insulating layer disposed between said first and second conductive layers, said first and second conductive layers and said first insulating layer forming a feedback capacitor arrangement;
a substrate including a grounding reference layer, said substrate being separated from said feedback capacitor arrangement;
a second insulating layer disposed on another surface of said substrate and adjacent to said second conductive layer;
an amplifier formed in said substrate, said amplifier having first and second inputs and an output, said first input being conductively coupled to said grounding layer;
first contact means conductively coupled between said first conductive layer and said second input of said amplifier; and
second contact means conductively coupled between said second conductive layer and said output of said amplifier, said first and second conductive contact means coupling said feedback capacitor arrangement between the respective input and output of said amplifier.

8. A detector structure comprising:
a photosensitive layer;
a first conductive layer adjacent over its entire area to said photosensitive layer for collecting charge carriers generated by radiation incident upon said photosensitive layer;
a second conductive layer separated from and substantially coextensive with said first conductive layer to substantially confine the electric field lines emanating from said first conductive layer in the region between said first and second conductive layers;

a first insulating layer disposed between said first and second conductive layers, said first and second conductive layers and said first insulating layer forming a feedback capacitor arrangement.

9. The detector structure of claim 8 which further comprises:
   a substrate;
   a grounding layer adjacent to one surface of said substrate;
   a second insulating layer adjacent to another surface of said substrate and adjacent to said second conductive layer;
   an amplifier formed in said substrate, said amplifier having first and second inputs and an output, said first input being conductively coupled to said grounding layer;
   first conductive contact means conductively coupled between said first conductive layer and said second input of said amplifier; and
   second conductive contact means conductively coupled between said second conductive layer and said output of said amplifier, said first and second conductive contact means coupling said feedback capacitor arrangement between the respective input and output of said amplifier.

10. The detector structure of claim 9 wherein said first and second conductive contact means each comprise a conductive contact disposed on one surface of said second insulating layer and a cold-weldable material disposed between respective conductive contacts and said first conductive layer and said second conductive layer, respectively.

11. The detector structure of claim 10 wherein the cold-weldable material comprises indium.

12. A detector structure comprising:
   a photosensitive layer;
   a first conductive layer adjacent over its entire area to said photosensitive layer for collecting charge carriers generated by radiation incident upon said photosensitive layer;
   a second conductive layer separated from and substantially coextensive with said first conductive layer to substantially confine the electric field lines emanating from said first conductive layer in the region between said first and second conductive layers;
   a first insulating layer disposed between said first and second conductive layers, said first and second conductive layer and said first insulating layer forming a feedback capacitor arrangement for an externally provided transimpedance amplifier;
   first conductive contact means conductively coupled to said first conductive layer; and
   second conductive contact means conductively coupled to said second conductive layer;
   said first and second conductive contact means providing a means for coupling said feedback capacitor arrangement to said amplifier.

13. The detector structure of claim 12 which further comprises:
   a substrate;
   a grounding layer adjacent to one surface of said substrate;
   a second insulating layer adjacent to another surface of said substrate and adjacent to said second conductive layer;
   a transimpedance amplifier formed in said substrate, said amplifier having first and second inputs and an output, said first input being conductively coupled to said grounding layer, said second input being coupled to said first conductive contact means, said output being coupled to said second conductive contact means.

* * * * *